(No Model.)
C. C. CHICKERING.
MANUFACTURE OF ARTICLES FROM CELLULOID AND OTHER PLASTIC MATERIALS.
No. 329,273. Patented Oct. 27, 1885.
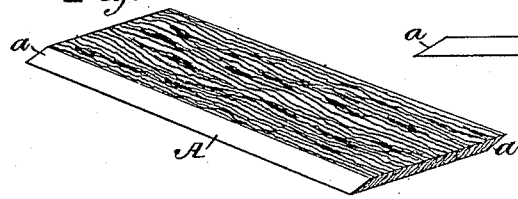
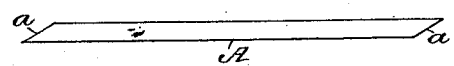
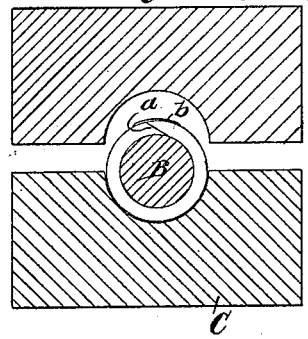
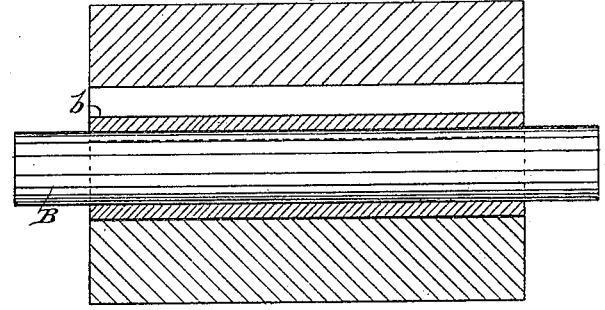
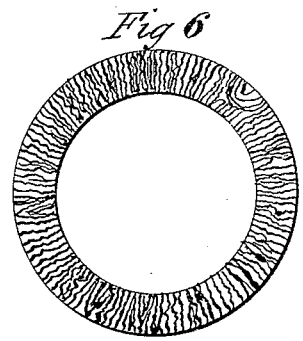
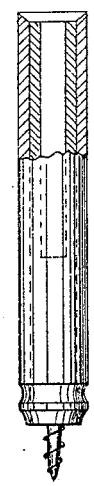
Witnesses.
G. William Rea
Robert Everett
Inventor.
Charles C. Chickering.
By James L. Norris.
Atty.

UNITED STATES PATENT OFFICE.

CHARLES C. CHICKERING, OF NEW YORK, N. Y., ASSIGNOR TO AMERICAN ZYLONITE COMPANY, OF ADAMS, MASSACHUSETTS.

MANUFACTURE OF ARTICLES FROM CELLULOID AND OTHER PLASTIC MATERIALS.

SPECIFICATION forming part of Letters Patent No. 329,273, dated October 27, 1885.

Application filed June 18, 1885. Serial No. 169,124. (No model.)

*To all whom it may concern:*

Be it known that I, CHARLES C. CHICKERING, a citizen of the United States, residing at New York, in the county of New York and State of New York, have invented new and useful Improvements in Manufacture of Articles from Celluloid and other Plastic Materials, of which the following is a specification.
My invention relates to an improved process and means for making tubes and other articles from plastic material—such as zylonite, celluloid, or other compounds having a pyroxyline base—and is of especial importance in the manipulation of those stratified materials known as "factitious grain ivory" in which it is desirable to preserve the natural appearance of the grain intact and without flaw or blemish.
The invention is also applicable to the manufacture of tubes, rings, and analogous forms from unstratified plastic material.

In the annexed drawings, Figure 1 represents in perspective a sheet or strip of celluloid, zylonite, or similar plastic material the longitudinal edges of which are beveled to facilitate the formation of a close-jointed seam. Fig. 2 is an edge view of said strip. Fig. 3 is a transverse section of a die and mandrel for forming a tube or tubular body. Fig. 4 is a longitudinal section of the same. Fig. 5 represents a finished tube. Fig. 6 shows on an enlarged scale a ring—such as a martingale-ring—formed by cutting the tube transversely;
and Fig. 7 illustrates a tubular body finished to serve as a handle for any article requiring that convenience, the core of the tubular body being of wood or other suitable material.

In the manufacture of tubes as heretofore practiced the plastic material has sometimes been forced out of an ejector or stuffer in a tubular form, or the rings or tubes have been punched or cut out of a solid sheet or block. When forced from an ejector, it is, however, impossible to preserve the individuality of the layers in the rings or finished articles, and when cut or punched from solid sheets there is obviously great waste of material. Besides, the prior methods involve expense and delay incident to seasoning the material throughout its vertical depth. These difficulties are effectually obviated by my improved methods of manufacture, and the grain or laminæ throughout the finished article will be the same as in the original stock prior to its being rolled and pressed into a tubular form. My process avoids the great waste of material incident to methods in which the article to be made is cut or punched from the sheet or block, and also obviates any necessity for delay on account of the time required for seasoning the material to be treated by cutting or punching.

In the practice of my invention I take a piece of sheet zylonite, celluloid, or similar plastic material compound, preferably having a pyroxyline base, and cut the same into strips of a size proper for the formation of tubes of the required length and diameter. I next bevel the longitudinal edges of each strip or piece A on alternate sides, as shown at $a\ a$, Figs. 1 and 2, so that when brought together they will overlap, thereby producing a tube of uniform thickness and having a close-fitting seam that is not liable to separate. The strip A, before bending, is softened or rendered flexible by heat, and is then rolled around the mandrel B into approximately the desired round, oval, square, or tubular form, and with the beveled edges $a\ a$ nearly or quite in contact. The mandrel B, with its surrounding tubular strip, is then placed in the lower part or half of a sectional mold or die, C, of approximate shape, as shown in Figs. 3 and 4. In placing the mandrel and tube within the die I prefer to arrange the seam uppermost and apply thereto a cement solvent—such as spirits of camphor or wood alcohol; or other suitable adhesive substance may be applied to the beveled edges of the seam. I usually apply over the seam a strip, $b$, of paper or other suitable material, to prevent the solvent from spreading too rapidly, and also present an obstacle to the entrance of dirt, dust, or extraneous matter which is apt to adhere to the interior of the die. This, however, may be dispensed with. The upper half, C', of the die is now brought down onto the tube and its inclosed mandrel and suitable pressure exerted by and upon the inclosed die, either with or without heat, the latter, however, being preferable, while inclosed in the die, and subjected therein to adequate pressure with the strip of pyroxyline material in contact with the mandrel. The tube will by these means take the desired form without impairing the grain of the material, and the seam at the overlapping edges *a a* will be accurately and permanently closed, thereby leaving no unsightly ridges and incurring no risk of separation. The process as described is most applicable to what is termed "seasoned material;" but by using what is termed "green material," which has not undergone the process of curing, the cement or solvent may be dispensed with, as the process of welding is easier effected with such material than with seasoned material. The beveled edges may in such case also be dispensed with. After remaining in the die a sufficient length of time to become set the tube and its mandrel are withdrawn and the tube detached from the mandrel. The tube is now ready for finishing by polishing or otherwise in any desirable manner. By providing the interior of the die with suitable designs a corresponding ornamentation will be impressed on the tubes while being formed. After the tubes are removed from the die and polished they are ready for the market, and are available as handles for canes, umbrellas, parasols, whisks, brushes, whips, and many other articles. Cut into short sections, as shown in Fig. 6, they serve as martingale-rings, napkin-rings, slide-rings for parasols and umbrellas, teething-rings for infants, and various other purposes.

By my process of manufacturing tubes from plastic compounds—such as celluloid, zylonite, &c.—the laminæ or stratification, if present in the original strip or sheet, as with artificial ivory, is preserved with unusual distinctness and with all the ordinary characteristics of natural ivory.

Having thus described my invention, what I claim, is—

1. The process of forming round, oval, square, or polygonal tubes from sheets of plastic material having pyroxyline for its base by pressing together the edges of a strip of such material with or without a cement or solvent in a sectional die upon and in contact with a mandrel, substantially as described.

2. Forming tubes from sheets of plastic material having pyroxyline for their bases by pressing strips with beveled edges in a sectional die upon and in contact with a mandrel aided by a cement or suitable solvent, the interposition over the joint and between the die and the plastic compound or strip of a fibrous, textile, membranous, or other suitable material, substantially as described, and for the purpose set forth.

3. The process of forming martingale and other rings from round, oval, square, or polygonal tubes composed of plastic material having pyroxyline as its base by pressing together the edges of a strip of such material in a sectional die upon and in contact with a mandrel, substantially as described.

4. The combination of a sectional die with a removable mandrel for the purpose of forming tubes from a plastic material having pyroxyline for its base.

In testimony whereof I affix my signature in presence of two witnesses.

CHARLES C. CHICKERING.

Witnesses:
EDWARD L. WOOD,
J. A. RUTHERFORD.